United States Patent Office 3,445,253
Patented May 20, 1969

3,445,253
PERLITE COMPOSITION, POROUS LOW DENSITY PERLITE STRUCTURE AND METHOD OF MAKING SAME
John M. Lee, Lake Jackson, Tex., assignor to The Dow Chemical Company, Midland, Mich., a corporation of Delaware
No Drawing. Filed Aug. 24, 1965, Ser. No. 482,286
Int. Cl. C04b 35/18
U.S. Cl. 106—40          14 Claims

ABSTRACT OF THE DISCLOSURE

Low density porous perlite structures, having good strength and insulating properties are prepared from a blend of (1) 45–87 parts of coarse perlite and 55–13 parts of fine perlite particles with (2) two to nine parts by weight of an alkali metal oxide, hydroxide, carbonate or bicarbonate or mixtures thereof, by drying the blend at a temperature not exceeding 400° C. and then further heating to 500–900° C., but below the fusion temperature, for ¼ to 24 hours, under a pressure of 1–200 p.s.i.g.

---

This invention relates to an expanded porous perlite material and to a method of its preparation and more particularly pertains to a rigid, low density perlite material having good strength, water resistance and insulating properties, by treating expanded perlite with an aqueous caustic, compacting the mixture and subjecting it to high temperature, with or without superimposed pressure.

The term "perlite" is used herein in a generic sense to designate all expansible volcanic glasses, composed essentially of aluminum silicates in varying degrees of hydration and combined with small amounts of alkalies. The various perlites will contain from about 70–75% $SiO_2$, from about 12–15% $Al_2O_3$, from about .5–6% bound water, from about .5–5% loss on ignition, from about 2–5% $Na_2O$, about 2–6% $K_2O$ and small amounts of other ingredients such as $Fe_2O_3$, $TiO_2$, CaO and MgO. Included under the term "perlite" are naturally occurring volcanic glasses, such as obsidian, vitrophyre, pitchstone, tachylite, pumice and vitric or glossy tuff. All these materials have the property of expanding on heating to a temperature of 850–1200° C. depending mainly on the composition. After expansion by heat, the perlite is comminuted and screened for obtaining the particle size range desired.

Expanded perlite has been used for forming insulating structures heretofore by blending with clay, asbestos, magnesia and dolomite, by combining the expanded perlite with clay and a flux, which is an alkaline earth acid phosphate or a form of phosphoric acid or a boron oxide; by adding a large proportion of kyanite and a significant amount of calcium aluminate to the perlite; or by blending the perlite with $Ca(OH)_2$, asbestos and diatomacous earth.

I have found that by blending, by weight, about 45–87 parts of a coarse perlite with 55–13 parts of a fine perlite, and 2–9 parts, preferably 4–7 parts, by weight, per 100 parts perlite, of caustic in solution, then drying the mixture at a temperature not exceeding 400° C. to remove most of the water and heating to a temperature of from about 500 to about 900° C., but below the fusion temperature, for ¼ to 24 hours, preferably in a mold, under a pressure of from about 1 to about 200 p.s.i., a low density, unitary mass is formed. The modulus of rupture can be varied over a wide range of about 6 to 260 pounds per square inch, and the compressive strength varies from about 14 to about 360 p.s.i. The products retain a high proportion of the compressive strength even after being completely immersed in water for thirty days.

The coarse perlite should have a particle size range such that about 95% by weight of the particles are 2–16 mesh (U.S. Standard) sieve and the fine perlite is of a particle size range such that about 96% passes through a 16 mesh sieve and about 10–20% passes through a 100 mesh sieve.

The caustic which can be used is any alkali metal oxide, hydroxide, carbonate or bicarbonate. These include the oxides, hydroxides, carbonates and bicarbonates of lithium, potassium, sodium, rubidium and cesium and mixtures of these compounds in any proportion. If too little caustic is used, the final product is friable and weak. If too much is used, the product becomes fused and has a high density. In order to assure uniform distribution of the caustic throughout the perlite, the most desirable way of adding the caustic to the perlite is to prepare a solution in any liquid medium such as water or liquid alcohols. The preferred caustics are sodium hydroxide, carbonate and bicarbonate, because of their relatively low cost, ready availability, and their ability to produce satisfactory rigid, porous materials. The preferred solvent is water. The concentration of caustic in the solvent is not critical, but, since it is essential to drive off the solvent by heat, a relatively high concentration in the order of 25–50% by weight or higher is preferred.

The physical condition of the expanded perlite-caustic mixture before drying can vary from a paste which is flowable to a dry appearing mix which can be blended thoroughly by tumbling.

The drying step can be effected at temperatures ranging from 30 to 300–400° C., but a preferred range is 90 to 120° C. when water is used as the solvent for the caustic. Regardless of the solvent used, care should be exercised not to cause such rapid evolution of vapors that the mix is loosened from the drying mold. For best results, the drying step should continue until at least 90% by weight of the solvent added with the caustic is removed by vaporization. Drying can be effected at atmospheric pressure, under reduced pressure or at pressures higher than atmospheric.

After drying, the mixture is heated to 500–900° C. for ¼ to 24 hours, preferably under a pressure of 1 to 100 p.s.i. The preferred temperature is 840–890° C. for ¼ to 2 hours. However, it is to be understood that the various expanded volcanic glasses have slightly different sintering and fusion temperatures. This difference is further accentuated by the amount of caustic added to the expanded perlite. As a general rule, lowest density products are produced when the low temperature heating range, low caustic content and low holding time are used. The use of low temperature heating also tends to produce products with relatively low modulus of rupture and compressive strength. With high ranges of caustic, usually lower temperatures and times can be used to obtain a particular degree of rigidity and strength.

For the purpose of determinating a satisfactory heating time and temperature to obtain the desired properties in the final product, a set of samples of the dry mixture containing the added caustic can be subjected to either a series of progressively increased heating cycles at a single temperature, or the samples can be individually heated for varying times at a single temperature or the time and temperature can be varied on individual samples. Each sample can then be tested for its physical properties and the conditions which give the properties closest to those desired can be used for the commercial product. Usually, one such series of tests suffices for a batch of an expanded perlite from a single source.

The examples which follow are intended to illustrate the invention, not to limit it. All parts are by weight unless otherwise specified.

EXAMPLE 1

The particle size distribution desired for the samples was obtained by blending various proportions of fine and coarse expanded perlite. The fine perlite had a density of about 43 g./100 ml. All the particles passed through a 12 mesh (U.S. Standard) sieve and 4% were retained on a 16 mesh sieve. The coarse particles had a density of about 89.8 g./100 ml. All passed through a 2 mesh sieve, 0.25% were retained on a 4 mesh, 26.5 were retained on a 6 mesh, 71% on a 12 mesh, 0.5% on 16 mesh and 1.5% passed throuhg the 16 mesh sieve. In each case, 120 g. of the blend of fine and coarse perlite was mixed thoroughly with 600 ml. of about 2.3 to 3.6% NaOH solution in water. The mixture was placed in a vacuum funnel and the excess aqueous material was filtered off with suction from a water aspirator. Normally, 380–400 ml. of solution were removed by this means, leaving a slurry of perlite-NaOH solution weighing 320–340 g. The slurry was further agitated and packed into tared nickel molds with a mono-layer of dry coarse expanded perlite to serve as a mold release material. The slurries were dried in an oven at 90° C. to a weight of 260–270 g. Then, the molds and their contents were placed in a muffle furnace and heated for various times at temperatures ranging from 840–860° C. The molds on removal from the furnace were permitted to cool to room temperature.

The caustic solution removed by filtration was diluted to 1 liter and titrated to determine the amount of NaOH retained by the perlite.

The data obtained in these tests are tabulated below in Table I.

TABLE I

| Perlite, grams | | NaOH in mix, Grams | Temp., °C. | Time (min.) | Density, lbs./ft.[3] | M.O.R.,[1] p.s.i. | Comp.,[2] p.s.i. | Comp.[3] after water soak, p.s.i. |
| --- | --- | --- | --- | --- | --- | --- | --- | --- |
| Coarse | Fine | | | | | | | |
| 91 | 29 | 5–5.5 | 860 | 35 | 11.9 | 9.9 | 30.7 | 18.4 |
| 70 | 50 | 5–5.5 | 860 | 35 | 17.5 | 36.1 | 112.1 | 65.9 |
| 91 | 29 | 5–5.5 | 860 | 45 | 11.2 | 8.2 | 20.9 | 29.9 |
| 70 | 50 | 5–5.5 | 860 | 45 | 15.9 | 27.9 | 46.5 | 34.2 |
| 91 | 29 | 7–7.7 | 860 | 35 | 16.3 | 13.2 | 43.7 | 63.0 |
| 70 | 50 | 7–7.7 | 860 | 35 | 16.3 | 13.4 | 64.2 | 72.5 |
| 91 | 29 | 7–7.7 | 860 | 45 | 22.4 | 122.6 | 351.6 | 334.2 |
| 70 | 50 | 7–7.7 | 860 | 45 | 19.0 | 51.8 | 195.3 | 117.5 |
| 91 | 29 | 5–5.5 | 840 | 45 | 12.2 | 14.2 | 14.6 | 19.2 |
| 70 | 50 | 5–5.5 | 840 | 45 | 13.5 | 15.0 | 28.5 | 21.5 |
| 91 | 29 | 7.7.7 | 840 | 35 | 14.0 | 15.7 | 30.3 | 46.5 |
| 70 | 50 | 7–7.7 | 840 | 35 | 12.8 | 10.1 | 39.1 | 16.2 |
| 91 | 29 | 7–7.7 | 840 | 45 | 13.8 | 32.9 | 55.9 | 60.5 |
| 70 | 50 | 7–7.7 | 840 | 45 | 14.7 | 39.8 | 54.8 | 73.1 |

[1] M.O.R.=Modulus of rupture.
[2] Comp.=Compression.
[3] Samples held in water for 30 days at room temperature before testing compression after water soak.

EXAMPLE 2

The fine perlite in these runs was such that only 1.6% by weight was retained on a 16 mesh (U.S. Standard) sieve and the remainder passed through. The coarse perlite all passed through a 2 mesh sieve, 9.5% was retained on a 4 mesh, 48% on a 6 mesh, 41% on a 12 mesh, 1% on a 16 mesh sieve and only 0.5% by weight passed through the 16 mesh sieve.

Prior trials showed that the perlite could absorb about 1.7 times its weight of water and could still be mixed in a V-type blender. The requisite amount of alkali was dissolved in the calculated amount of water and added to the batch containing various proportions of fine and coarse perlite. After thorough blending, the wet mix was placed in nickel molds and dried at 90° C. to less than 10% water by weight. Then, the molds were placed in a muffle furnace at the various temperatures for various lengths of time.

The data obtained in these runs are listed in Table II below.

TABLE II

| Perlite, grams | | NaOH in mix, Grams | Temp., °C. | Time (min.) | Density, lbs./ft.[3] | M.O.R.,[1] p.s.i. | Comp.,[2] p.s.i. | Comp.[3] after water soak, p.s.i. |
| --- | --- | --- | --- | --- | --- | --- | --- | --- |
| Coarse | Fine | | | | | | | |
| 91 | 29 | 6.6 | 850 | 40 | 14.9 | 73.5 | 80.1 | 7.19 |
| 91 | 29 | 6.6 | 870 | 40 | 15.4 | 36.7 | 97.8 | 120.9 |
| 70 | 50 | 6.6 | 870 | 40 | 14.3 | 77.9 | 94.4 | 89.9 |
| 91 | 29 | 9.0 | 870 | 50 | 24.7 | 96.2 | 291.1 | 282.4 |
| 70 | 50 | 9.0 | 870 | 40 | 18.9 | 210.1 | 178.4 | 168.0 |
| 70 | 50 | 9.0 | 870 | 50 | 24.7 | 112.8 | 191.8 | 212.8 |
| 70 | 50 | 9.0 | 560 | ([4]) | 3.8 | 7.0 | 31.5 | |

[1] M.O.R.=Modulus of rupture.
[2] Comp.=Compression.
[3] Compression after soak-tests run on samples after 30 days in water at room temperature.
[4] 17 hours.

EXAMPLE 3

The perlites defined in Example 1 were blended in a ratio of 81 g. of the coarse to 39 g. of the fine. The procedure described in Example 1 was also followed. It was determined that about 291/ml. water and 9 g. of NaOH were present in the mix after filtering. The mix was dried and then subjected to 40 minutes heating at 850° C. There resulted a well sintered unitary structure, similar in properties to those already described.

In all instances, the heating in the muffle furnace was carried out under ambient pressure.

It is also possible to use a continuous process for preparing the porous, rigid perlite structures by depositing the wet mix onto an endless traveling mold, passing it through a drying mechanism and then through a furnace where the final heating step is effected at the times and temperatures indicated. For applying pressure in the furnace, an endless metal belt made of an oxidation and alkali resistant metal can be superimposed on top of the layer of alkali containing perlite and pressure can be applied to the belt by means of rolls pressing against the top surface of the belt as the latter is in contact with the perlite. The continuous porous perlite structure can be removed from the outlet of the furnace and cut into segments of the desired size by a transverse knife arrangement.

It is also possible to add dry alkali with dry perlite and blend in an atmosphere of high humidity, such as that obtained by passing low pressure steam through the mixing environment.

The effects of alkali are shown by comparative tests in which a portion of a mixture of 81 parts coarse and 39 parts of fine perlite was thoroughly moistened with water, dried and subjected to various temperatures for ½ hour. There was no evidence of any fusion at temperatures of 600–950° C. When a second portion of the same perlite mixture was throughly moistened with a 1% NaOH solution in water and treated in the same manner, the alkali containing perlite fused to a unitary mass at 950° C.

In the final heat treatment, care must be used to prevent the complete fusion of the perlite used, because in such case a high density molten mass will be obtained.

The compressive strength was measured on a Tinius-Olsen Tensile tester at a loading rate of 0.1 inch/min. using a 1 x 1 x 2 inch sample and applying the load normal to the 1 inch surface.

The modulus of rupture was determined on 2 x 6 x 1 inch samples with center point loading of 5 inch suspension perpendicular to the 2 inch surface.

Slabs measuring 34 x 34 x 2 inches of the perlite structure of this invention were prepared. The thermal conductivity of the perlite board varied from about .4 to .6 B.t.u. 1 hr./sq. ft./° F./in. in the density range of about 15 to 20 lbs./ft.$^3$. In one test where a 1⅛ inch thick perlite board was placed over the opening of a furnace heated to 700° C., the outer surface of the board stabilized at 115° F. in an area where ambient temperature was about 23° C. When the other alkali metal compounds mentioned herein are substituted for NaOH in equivalent quantities, results similar to those described are obtained.

If desired, the mixture can contain reinforcing fibers or strands of heat and alkali resistant material such as asbestos or metal wire. Particularly effective in increasing the modulus of rupture are wires of stainless steel, copper, galvanized steel and Nichrome of 8–43 mil thickness or smaller.

The structures can be used as insulating blocks or panels on buildings or space heating furnaces, as low density fire-wall curtains, or as insulating material for steam or other heat exchange pipelines.

I claim:

1. A mixture of expanded perlite having from about 55 to about 87% by weight of particles between 2 and 16 mesh and about 45 to about 13% by weight of particles below 16 mesh, uniformly blended with from about 2 to about 9 parts by weight of the mixture of an alkali metal compound selected from the group consisting of oxides, hydroxides, carbonates, bicarbonates and mixtures thereof.

2. The mixture of claim 1 in which the alkali metal compound is a compound of sodium.

3. The mixture of claim 1 in which the alkali metal compound is NaOH.

4. The mixture of claim 1 in which the alkali metal compound is $Na_2CO_3$.

5. The mixture of claim 1 in which the alkali metal compound is $NaHCO_3$.

6. The mixture of claim 1 in which the alkali metal compound is an alkali metal hydroxide.

7. The mixture of claim 1 in which the alkali metal compound is an alkali metal carbonate.

8. The mixture of claim 1 in which the alkali metal compound is an alkali metal bicarbonate.

9. A mixture consisting essentially of 58 to 75% by weight of expanded perlite having a particle size range of 4–16 mesh, and 42 to 25% by weight of particles smaller than 16 mesh, and from about 4 to about 9 parts based on 100 parts of the perlite of NaOH, uniformly dispersed throughout the perlite.

10. A method of preparing a porous perlite structure comprising:
(a) preparing a blend of from about 55 to about 87% by weight of expanded perlite having a particle size range of 4–16 mesh, and about 45 to about 13% by weight having a particle size range smaller than 16 mesh,
(b) adding a solution of an inorganic alkali metal compound selected from the group consisting of oxides, hydroxides, carbonates and bicarbonates, and mixtures thereof to provide from about 2 to about 9 parts by weight of said compound for each 100 parts by weight of said perlite,
(c) evaporating at least part of the solvent from the mixture of said perlite and said alkali metal compound, and
(d) heating the so dried mixture of perlite-alkali metal compound to a temperature of from about 500 to about 950° C. for a time sufficient to provide a unitary structure but not sufficient to completely fuse the perlite.

11. The method of claim 10 in which the alkali metal compound is a compound of sodium, and the solvent is water.

12. A method of preparing a porous, expanded perlite structure comprising:
(a) preparing a blend of from about 58 to 75% by weight of expanded perlite particles of 4–16 mesh size and about 42 to 25% by weight of particles of a size smaller than 16 mesh,
(b) adding to said perlite an aqueous solution of sodium hydroxide in a quantity sufficient to provide from about 2 to about 9 parts by weight of said hydroxide per 100 parts of perlite,
(c) drying the mixture of perlite-alkali metal compound to below about 10% by weight of water, and
(d) heating the so dried mixture at a temperature between about 560 and 870° C. for a period of from about ½ hour to about 17 hours.

13. The method of claim 12 in which NaOH in water is added to the perlite to provide 4–9 parts NaOH per 100 parts perlite and in which the heating temperature is 840–870° C. for 30–50 minutes.

14. A unitary perlite structure consisting essentially of a multiplicity of expanded perlite particles of various mesh sizes, said particles having surfaces bonded together at their points of contact with one another by fusion effected with from about 2 to about 9 parts by weight based on the total weight of the mixture, an alkali metal caustic compound selected from the class consisting of oxides, hydroxides, carbonates or bicarbonates and mixtures thereof, said structure having a modulus of rupture range of about 6 to 260 pounds per square inch, compressive strength of from about 14 to about 360 pounds per square inch and a density of from about 3.8 to about 24.7 pounds per cubic foot.

References Cited

UNITED STATES PATENTS

| 2,209,163 | 7/1940 | Kaloustian | 106—40 |
| 2,583,292 | 1/1952 | Bowen et al. | 106—40 |
| 2,600,812 | 6/1952 | Thomas. | |

JAMES E. POER, *Primary Examiner.*

U.S. Cl. X.R.

106—286; 252—62